(12) United States Patent
Roberts (10) Patent No.: US 7,316,301 B2
(45) Date of Patent: Jan. 8, 2008

(54) BRAKE CALIPER

(75) Inventor: Paul Roberts, Newport (GB)

(73) Assignee: Meritor Heavy Vehicle Braking Systems (UK) Ltd., Gwent (GB)

( * ) Notice: Subject to any disclaimer, the term of this patent is extended or adjusted under 35 U.S.C. 154(b) by 0 days.

(21) Appl. No.: 10/954,161

(22) Filed: Sep. 29, 2004

(65) Prior Publication Data

US 2005/0067232 A1     Mar. 31, 2005

(30) Foreign Application Priority Data

Sep. 30, 2003    (GB)    ................... 0322910.1

(51) Int. Cl.
*F16D 65/04*    (2006.01)
(52) U.S. Cl. .............. 188/250 B; 188/250 G; 188/73.1; 188/73.37
(58) Field of Classification Search ........ 188/73.1, 188/73.31, 73.36, 73.37, 73.39, 206 R, 250 B, 188/250 G, 250 D, 196 R
See application file for complete search history.

(56) References Cited

U.S. PATENT DOCUMENTS

| | | | |
|---|---|---|---|
| 4,220,223 A * | 9/1980 | Rinker et al. .............. 188/73.1 |
| 4,241,327 A * | 12/1980 | Yamamoto ................ 340/454 |
| 6,279,222 B1 | 8/2001 | Bunker et al. |
| 6,367,594 B1 | 4/2002 | Barbosa et al. |

FOREIGN PATENT DOCUMENTS

| | | |
|---|---|---|
| DE | 38 03 069 | 3/1989 |
| EP | 1 085 229 | 3/2001 |
| FR | 2 359 475 | 7/1984 |
| JP | 5209640 A * | 8/1993 |
| JP | 7139570 | 5/1995 |
| WO | WO 2004/025134 | 3/2004 |

* cited by examiner

*Primary Examiner*—Melody M. Burch
(74) *Attorney, Agent, or Firm*—Carlson, Gaskey & Olds (57) ABSTRACT

A brake caliper includes an actuator, a moveable brake pad including a brake pad backplate having a generally planar portion, and a friction material secured to the brake pad backplate. The brake pad backplate is being generally arcuate in shape and defines a friction material outer radius and has a friction face for engagement with a brake disc. The brake pad defines a wear limit of the friction material at a wear limit plane that is parallel to the friction face. The brake pad backplate includes a first pad abutment to limit rotation of the brake pad in a first direction. The first pad abutment is defined on a first lug surface of a first lug projecting from the generally planar portion, and the first lug surface is at a radius larger than the friction material outer radius and is positioned on the friction face side of the wear limit plane. The brake caliper also includes a stationary brake pad and a frame having a housing region for receiving the actuator, a reaction side portion for receiving the stationary brake pad in an axially static manner, and a first bridge arm connecting the housing region to the reaction side portion. The actuator is operable to move the moveable brake pad towards the stationary brake pad. The first pad abutment engages a first bridge abutment on the first bridge arm to limit rotation of the brake pad in the first direction.

47 Claims, 10 Drawing Sheets

FIG. 2

Prior Art

BRAKE CALIPER

REFERENCE TO RELATED APPLICATION

This application claims priority to Great Britain Patent Application 03229910.1 filed on Sep. 30, 2003.

BACKGROUND OF THE INVENTION

The present invention relates generally to brake pads and to brake calipers, particularly for heavy commercial vehicles, such as lorries, trucks and trailer units for lorries and trucks.

Known brake arrangements include a brake carrier fixed to a suspension component of a vehicle and a slideably mounted caliper having a pair of brake pads, between which sits a brake rotor (brake disc). An actuator, generally mounted on an inboard side (also known as an actuator side) of the caliper, is capable of forcing the inboard pad (also known as an actuator side pad) towards the brake rotor. A caliper frame is slideably mounted on pins or the like. A reaction force causes the caliper frame to slide inboard as the inboard pad moves towards the brake rotor. This causes an outboard portion (also known as a reaction side portion) of the caliper frame to force the outboard pad (also known as a reaction side pad) to contact and brake the brake rotor in conjunction with the inboard pad. The brake rotor itself is axially fixed.

Pad abutments prevent the brake pads from rotating with the brake rotor during braking. Typically, the pad abutments engage corresponding carrier abutments of the brake carrier. Thus, the caliper frame slides relative to the brake carrier, and the brake carrier is axially fixed relative to the brake rotor. Hence, the carrier abutments are axially fixed relative to the brake rotor.

Typically, each brake pad includes a steel brake pad backplate to which friction material is secured. Braking torque is transferred from the friction material, to the brake pad backplate, to the pad abutment, and then to the carrier abutment.

As the friction material on the inboard brake pad wears, the inboard brake pad backplate advances towards the axially fixed brake rotor. Similarly, as the friction material on the outboard brake pad wears, the outboard brake pad backplate advances towards the axially fixed brake rotor.

The above design is known as a sliding caliper brake, an example of which is described in Japanese Patent Application 7-139570. Fixed caliper/sliding rotor brakes are also known. In such a brake, the caliper is fixed relative to a suspension component of the vehicle and includes caliper abutments that the brake pad abutments react against. The brake rotor includes splines to allow movement relative to the brake caliper when the brakes are applied. Therefore, the brake rotor moves relative to the caliper abutments. Such a moveable caliper is disclosed in European Patent Application 1074757.

As the frictional material of brake pads on a fixed caliper/sliding rotor brake wear, the movement of the brake pads and the brake rotor is significantly different to the movement of the brake pads and the brake rotor when the friction material of a sliding caliper brake wears. Thus, when the friction material of the reaction side pad of the fixed caliper/sliding rotor brake wears, the reaction side brake pad backplate remains stationary. Hence, the sliding rotor advances towards the reaction side brake pad backplate. This requires the actuator side brake pad to also move towards the reaction side brake pad to maintain a correct running clearance between the actuator side brake pad and the brake rotor. This movement results from wear on the reaction side brake pad friction material. When the actuator side brake pad friction material wears, the actuator side brake pad backplate must advance towards the brake rotor to maintain a correct running clearance between the friction material and the brake rotor. For example, assuming that the friction material on the actuator and reaction side brake pads wear at the same rate, for every one millimeter of wear of the friction material on the actuator and reaction side brake pads, the brake rotor must advance towards the reaction side brake pad backplate by 1 millimeter. The actuator side brake pad backplate must, however, advance towards the reaction side brake pad backplate by two millimeters i.e., the total wear on both the brake pads. Thus, the actuator side brake pad backplate on a fixed caliper/sliding rotor brake moves twice as far as the equivalent actuator side brake pad backplate on a sliding caliper brake. This means that the caliper abutments that the actuator side brake pad abuts against on a fixed caliper/sliding rotor brake must accommodate twice as much movement of the actuator side brake pad as an equivalent sliding caliper brake. This causes significant problems in the design and packaging of a suitable caliper and pad abutment for the actuator side brake pad of a fixed caliper/sliding rotor brake.

SUMMARY OF THE INVENTION

The present invention provides an improved fixed caliper/sliding rotor braking system. A brake caliper includes an actuator, a moveable brake pad including a brake pad backplate having a generally planar portion, and a friction material secured to the brake pad backplate. The friction material is generally arcuate in shape and defines a friction material outer radius and has a friction face for engagement with a brake disc.

The brake pad defines a wear limit of the friction material at a wear limit plane that is parallel to the friction face. The brake pad backplate includes a first pad abutment to limit rotation of the brake pad in a first direction. The first pad abutment is defined on a first lug surface of a first lug that projects from the generally planar portion. The first lug surface is located at a radius that is larger than the friction material outer radius and is positioned on the friction face side of the wear limit plane.

The brake pad also includes a stationary brake pad and a frame. The frame includes a housing region for receiving the actuator, a reaction side portion for receiving the stationary brake pad in an axially static manner, and a first bridge arm connecting the housing region to the reaction side portion. The actuator is operable to move the moveable brake pad towards the stationary brake pad. The first pad abutment engages a first bridge abutment on the first bridge arm to limit rotation of the brake pad in the first direction.

These and other features of the present invention will be best understood from the following specification and drawings.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
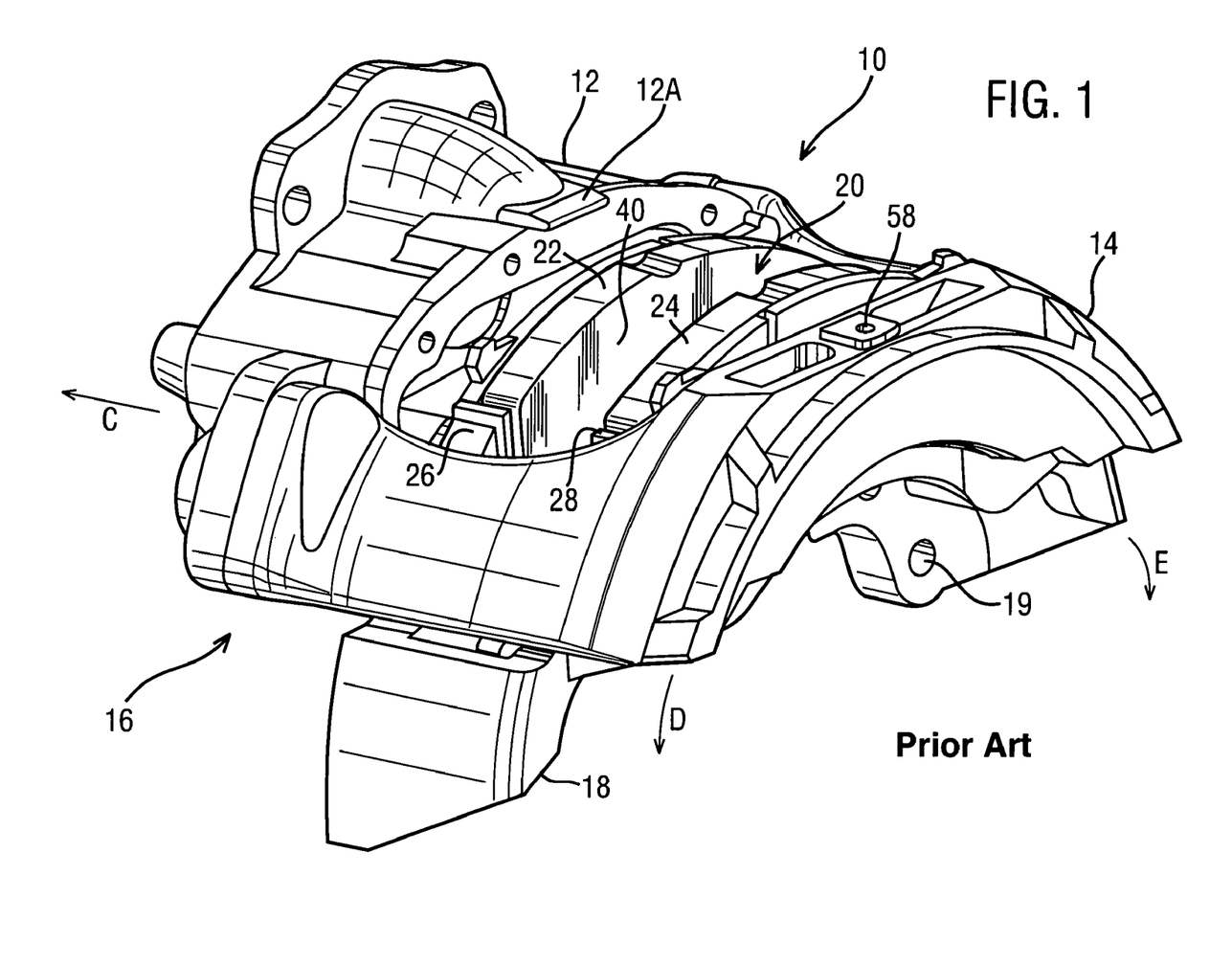
FIG. 1 is an isometric view of a known sliding caliper brake arrangement.
Figure 2:
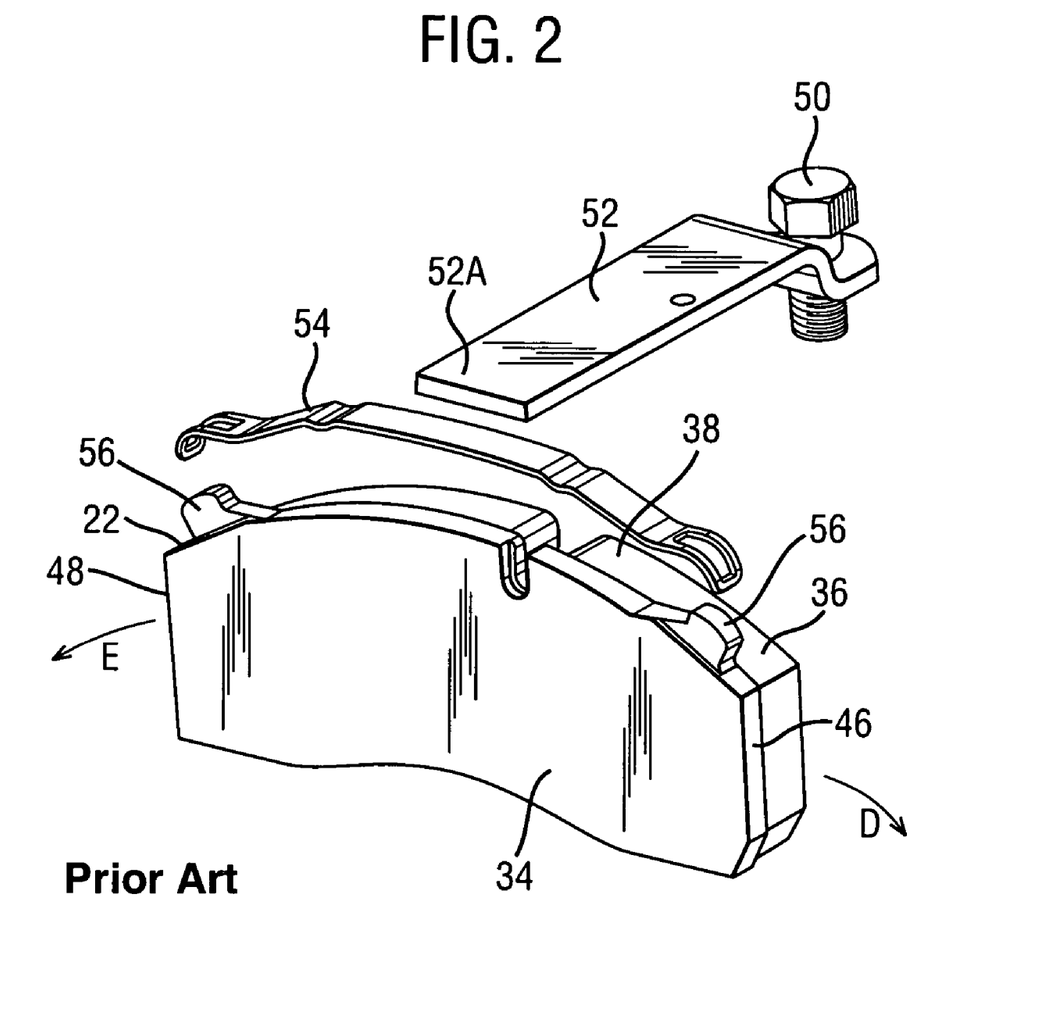
FIG. 2 is an isometric view of certain components of FIG. 1.

FIGS. 1 and 2 show a known sliding caliper 10 including an actuator housing 12 and a bridge arrangement 14 that together form a caliper frame 16. The caliper frame 16 is slideably mounted on pins (not shown) relative to a carrier 18. The carrier 18 is fixed via holes 19 to a suspension component of an associated vehicle. An inner brake pad 22 and an outer brake pad 24 are mounted within a recess of the caliper frame 16. The outer brake pad 24 sits in a recess of the bridge arrangement 14. The carrier 18 has an inner carrier abutment 26 and an outer carrier abutment 28. A brake rotor (not shown), such as a brake disc, sits with an aperture 20 between the inner brake pad 22 and outer brake pad 24. The brake disc is axially fixed relative to the carrier 18, i.e., it cannot move axially relative to the carrier 18.

An actuator (not shown) is mounted within the actuator housing 12. When operated, the actuator forces the inner brake pad 22 towards the brake rotor. Once the inner brake pad 22 contacts the brake rotor, a reaction force causes the caliper frame 16 to move in the direction of arrow C of FIG. 1 (i.e., the actuator housing 12 moves away from the brake rotor), thereby drawing the outer brake pad 24 into contact with the brake rotor. Continued operation of the actuator then causes the brake pad to squeeze the brake rotor, thereby applying a braking torque. The braking torque is reacted through the inner carrier abutment 26 and the outer carrier abutment 28. As such, no braking reaction is transmitted through the pins. The actuator constitutes a single actuator arrangement such that there is only one actuator in the brake caliper. In this case, the actuator is on the inboard side of the brake disc. That is, there is no actuator arrangement on the outboard side of the brake disc.

FIG. 2 shows the inner brake pad 22. The outer brake pad 24 is identical to the inner brake pad 22. The inner brake pad 22 includes a generally planar backplate 34, and friction material 36 secured on one side of the generally planar backplate 34. The generally planar backplate 34 is generally arcuate and has circumferential ends 46 and 48.

The friction material 36 is also generally arcuate. In particular, a radially outwardly facing surface 38 defines an outer radius of the friction material 36. This radius is very similar to the outer radius of the brake rotor with which the brake pad is designed to be used. The full friction face 40 of the friction material 36 can therefore be utilized, as can the full radial extent of the friction surface of the brake rotor.

For example, if the brake rotor rotates in the direction of arrow D (shown FIGS. 1 and 2) and the brakes are applied, then the brake rotor tends to drag the inner brake pad 22 in the direction of arrow D. However, the inner brake pad 22 is prevented from rotating since the circumferential end 46 of the generally planar backplate 34 abuts the inner carrier abutment 26. Similarly, when the brake rotor rotates in the direction of arrow E (shown in FIGS. 1 and 2) and the brakes are applied, the circumferential end 48 of the generally planar backplate 34 abuts the corresponding inner carrier abutment (not shown).

Both circumferential ends 46 and 48, and hence the inner carrier abutment 26 and the outer carrier abutment 28, are all positioned at a radius smaller than the outer radius of the friction material 36.

Ears 56 are positioned radially outboard of the outer radius of the friction material 36. The ears 56 are engaged by a spring 54 that reacts against a plate 52 to prevent the inner brake pad 22 from moving radially outwardly in use. An end 52A of the plate 52 is located underneath a boss 12A of the actuator housing 12, and a bolt 50 is received in a threaded hole 58 to secure the plate 52 onto the caliper frame 16. The ears 56 do not prevent the brake pads from rotating when the brakes are applied.

FIGS. 3 to 9 show a brake caliper 110 and a brake pad according to the present invention. The brake caliper 110 includes an actuator housing 112 positioned on an inboard side IB (an actuator side) of a brake rotor 160, and a reaction side portion 114 positioned on an outboard side OB (a reaction side) of the brake rotor 160.

Figure 3:
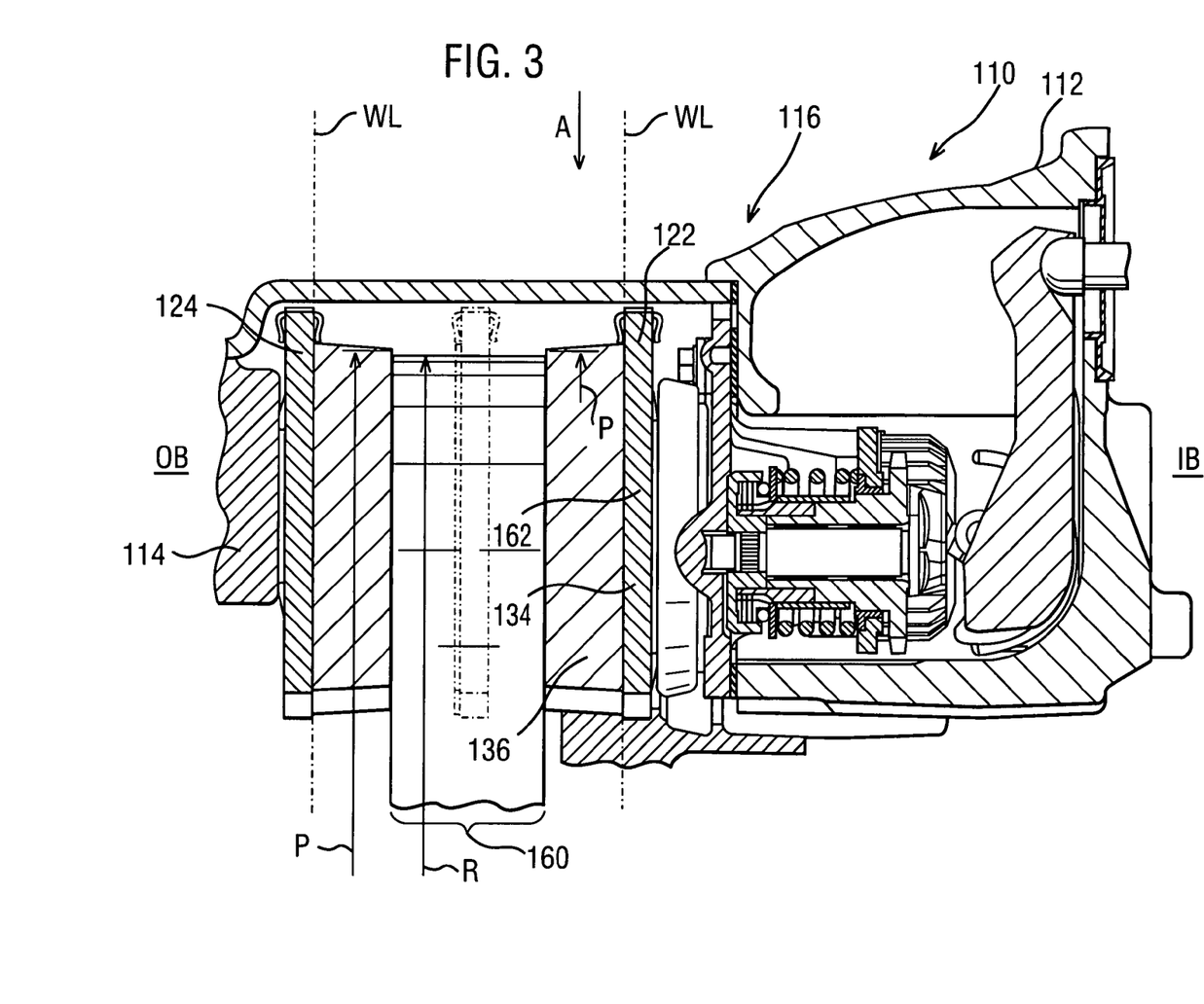
FIG. 3 is a cross section view of a caliper according to the present invention including a brake pad according to the present invention.

The reaction side portion 114 defines a stationary pad region 114A which receives the stationary brake pad 124 (an outer brake pad). In particular, the stationary brake pad 124 does not move axially (when considering axis A1 of the brake rotor) relative to the frame 116.

The brake caliper 110 further includes a first bridge arm 115A and a second bridge arm 115B that connect the actuator housing 112 to the reaction side portion 114. The actuator housing 112, the first bridge arm 115A, the second bridge arm 115B and the reaction side portion 114 together define the frame 116.

In this case, the brake caliper 110 is a fixed caliper and includes fixing features 190 that axially secure the frame 116 relative to a suspension component 191. The fixing features 190 can be lugs or bosses having a hole through which a fixing feature 190A, such as a bolt, can pass and thread into a threaded hole in the suspension component 191. Alternatively, the fixing feature 190 can be an elongate stud having a threaded end, where the stud passes through a clearance hole in the suspension component 191 and is then secured by a threaded nut. In this case, the brake rotor 160 includes internal splines (not shown) that allow the brake rotor to slide along axis A1 on a corresponding externally splined part (not shown) of the suspension component 191 relative to the frame 116.

An actuator 112A is mounted within the actuator housing 112 and defines a single actuator arrangement. Actuation of the actuator 112A squeezes the brake rotor 160 between the stationary (or reaction side) brake pad 124 and the moveable (or actuator side) brake pad 122. The moveable brake pad 122 is identical to the stationary brake pad 124 and (best seen in FIGS. 5 to 7) includes a brake pad backplate 134 to which the friction material 136 is fixed.

The friction material 136 is generally arcuate and defines an outer radius P which is substantially the same as the outer radius R of the brake rotor 160. The friction material 136 has a friction face 140 which engages the brake rotor 160 during braking. The brake pad backplate 134 has a generally planar region 162.

A first lug 164, a further first lug 165, a second lug 166 and a further second lug 167 project from the generally planar region 162 of the brake pad backplate 134. The first lug 164 projects towards the brake rotor 160 relative to the generally planar region 162, and the further first lug 165 projects away from the brake rotor 160. The combination of a first circumferential end surface region 170 (see FIGS. 8 and 9), a first lug surface 171 of the first lug 164, and a further first lug surface 172 of the further first lug 165 provide a first pad abutment 174 which engages a first bridge abutment 180A of the first bridge arm 115A. The first pad abutment 174 and the first bridge abutment 180A are radially orientated. The end surface region 170, the first lug surface 171 and the first lug surface 172 are each shown cross hatched in FIG. 9 for clarity. Contact between the first bridge abutment 180A and the first pad abutment 174 prevents rotation of the brake pad as the brakes are applied. In particular, substantially the entire first pad abutment 174 contacts a part of the first bridge abutment 180A. Because the brake caliper 110 is of a fixed caliper/sliding rotor design, the first bridge abutment 1 80A must accommodate twice as much relative movement of the actuator side pad as an equivalent abutment of a sliding caliper design, such as disclosed in Japanese Patent Application 7-139570. For this reason, the first bridge abutment 180A is generally planar or generally flat and does not include any localized projections (such as the projections of JP7-1395790) and hence is generally uniform and smooth. Thus, the first pad abutment 174 performs the same function as the circumferential end 46 of the generally planar backplate 34.

Figure 5:
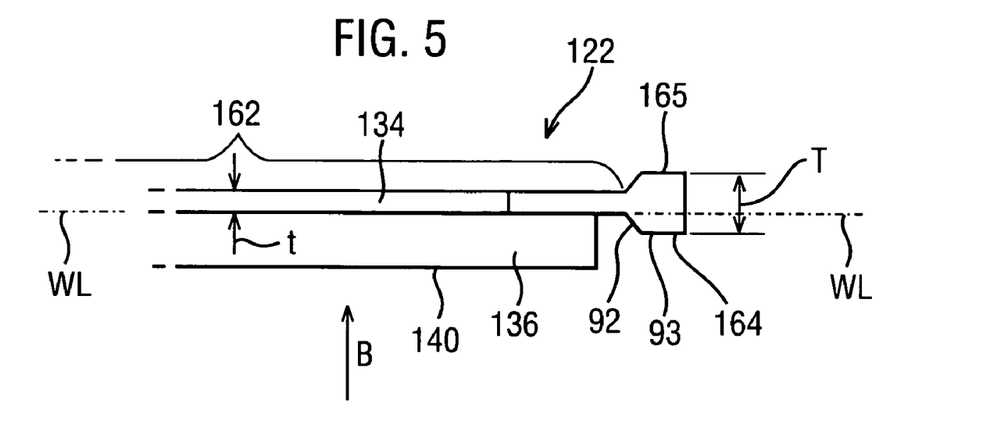
FIG. 5 is a view of a brake pad according to the present invention taking in the direction of arrow A of FIG. 3.
Figure 6:
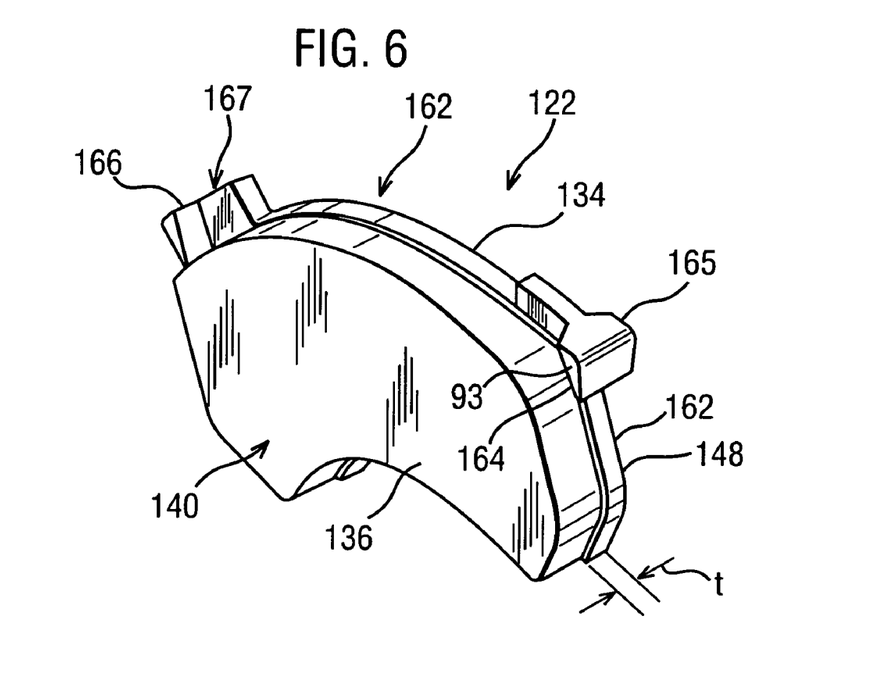
FIG. 6 is an isometric view of the brake pad of FIG. 5.

FIGS. 5 and 6 show that the first lug 164 generally tapers, in as much as the surface 92 tapers. The end surface 93 is generally triangular and the area of the end surface 93 is less than the area of a cross section of the first lug 164 taken at the wear limit due to the taper. Any cross sectional area taken parallel to the wear limit plane of a part of the first lug 164 remote from the generally planar portion is smaller than the cross section area of a part of the lug approximate the generally planar region 162. Because of the bending forces across the first pad abutment 174, it is possible for the first lug 164 and the further first lug 165 to taper in this manner while still providing lugs that are strong enough to cope with the forces. The tapering also allows the brake pad to be lighter.

The brake pad backplate 134 can be formed in several ways. For example, the brake pad backplate 134 can be cast. Additionally, the brake pad backplate 134 can be formed by stamping a backplate blank and then locally deforming the blank to form the first lug 164, the further first lug 165, the second lug 166 and the further second lug 167. Alternately, the brake pad backplate 134 can be forged.

Figure 7:
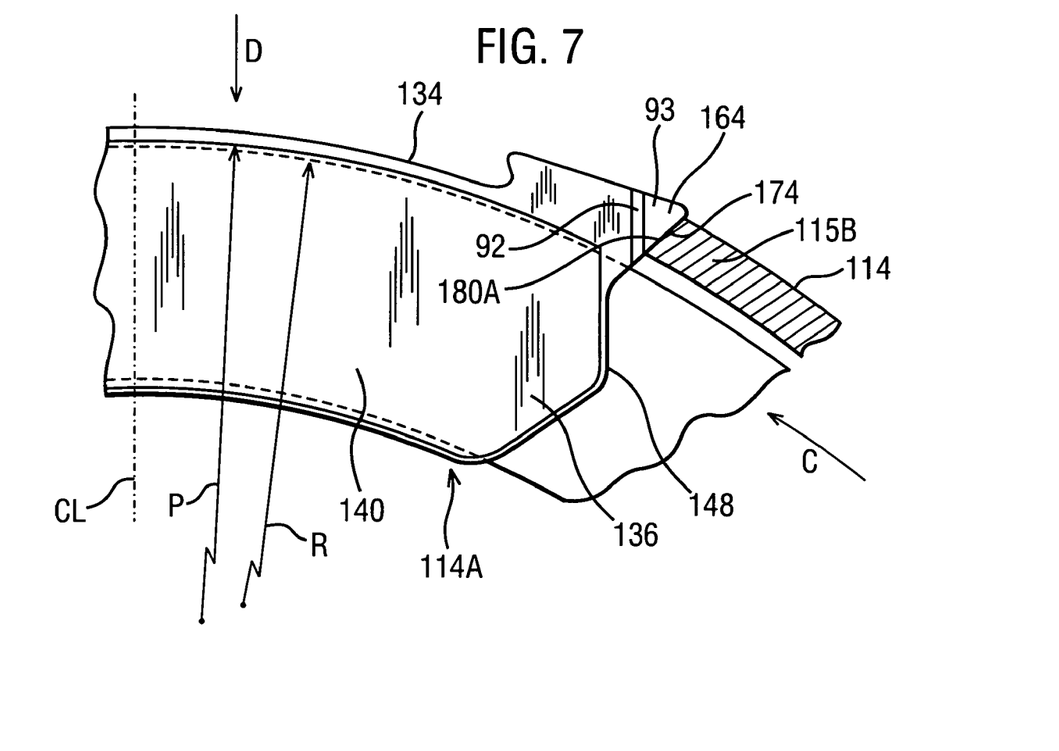
FIG. 7 is a view of the brake pad of FIG. 5 taken in the direction of arrow B of FIG. 5.
Figure 7A:
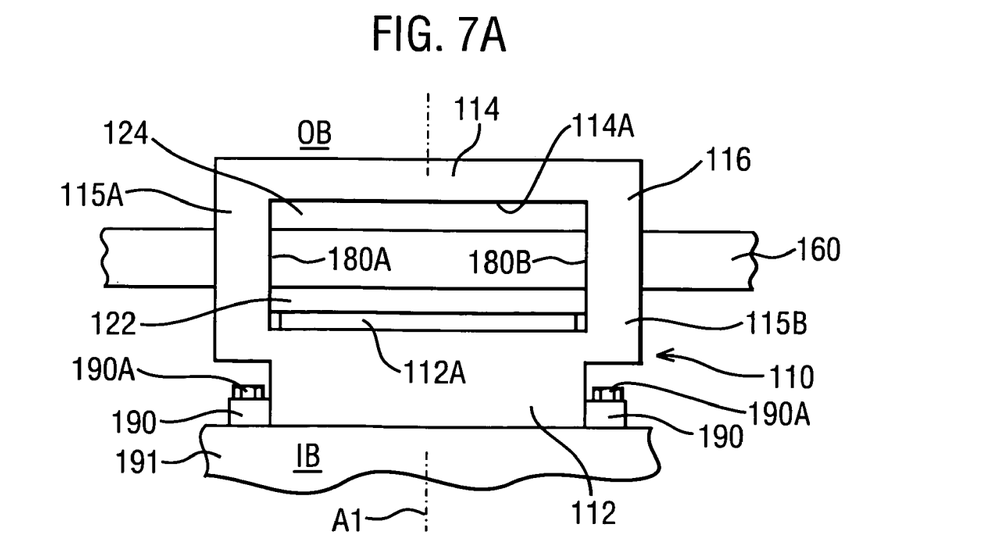
FIG. 7a is a schematic view of the calipers of FIG. 3 taken in the direction of arrow A.

The moveable brake pad 122 is symmetrical about a centerline CL (see FIG. 7). Thus, a second pad abutment (not shown) is defined by a combination of a second circumferential end surface region, a second lug surface of the second lug 166 and a further second lug surface of the further second lug 167. The second pad abutment engages a corresponding second bridge abutment 180B, which is symmetrically disposed about the centerline CL relative to the first bridge abutment 180A. The second pad abutment and the second bridge abutment 180B are radially oriented.

The first pad abutment 174 is provided at a radius that is larger than the outer radius R of the brake rotor 160, i.e., it is provided radially outboard of the outer radius R. Furthermore, the first pad abutment 174 is provided radially outboard of the outer radius P of the friction material 136.

Figure 4:
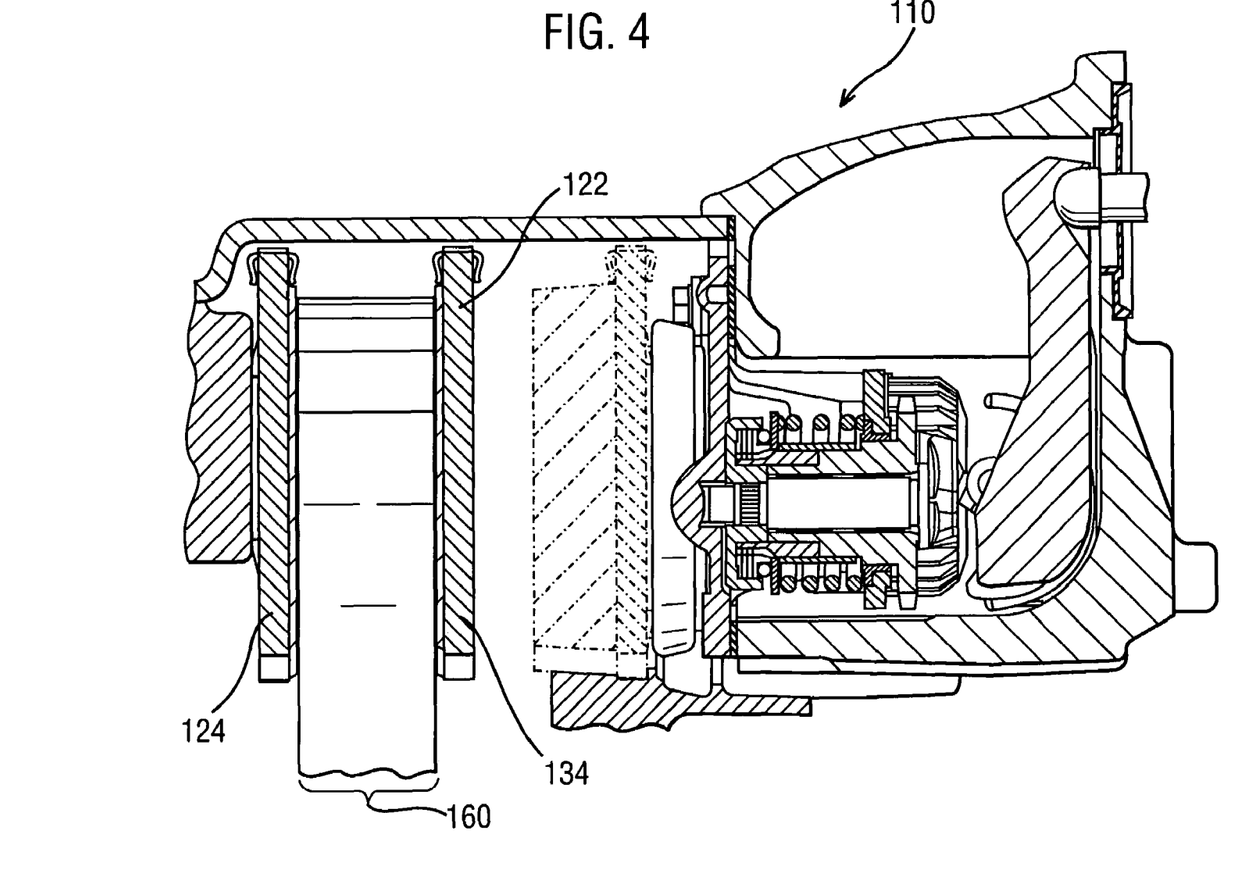
FIG. 4 is another cross section view of a calliper according to the present invention including a brake pad.

FIG. 3 shows the brake rotor 160, the moveable brake pad 122 and the stationary brake pad 124. FIG. 4 shows the position of the brake rotor 160 when the brake pads have worn and when the brake rotor 160 itself has been worn. The left hand side of the brake rotor 160 is very near the brake pad backplate 134 of the stationary brake pad 124. A comparison of the relative thickness of the brake rotor 160 as shown in FIGS. 3 and 4 shows that the brake rotor of FIG. 4 is drawn in a worn condition, i.e., it is thinner than the brake rotor 160 shown in FIG. 3. The moveable brake pad 122 of FIG. 4 is also shown in a very worn condition, and hence the brake pad backplate 134 is very near the right hand side of the brake rotor 160 when viewing FIG. 4.

FIG. 4 also shows the unworn stationary brake pad 124 and the unworn moveable brake pad 122 for comparative purposes. The actuator mechanism is shown in the same position in FIGS. 3 and FIG. 4 for clarity.

The worn condition (FIG. 4) of the moveable brake pad 122 is situated in a position previously occupied by the brake rotor 160 when the pads and the brake rotor 160 were in an unworn condition. The first pad abutment 174 is provided radially outboard of the brake rotor 160, and then the first pad abutment 174 is still effective in preventing rotation of the moveable brake pad 122 when applying the brakes with worn pads and brake rotors 160. All brake pads have a wear limit. If the brake pads continue to be used once they have reached their wear limit, then brake damage or brake failure occurs.

Considering FIG. 2, the friction material 36 is fixed to a flat region of the generally planar backplate 34. Thus, the wear limit on the inner brake pad 22 is the interface between the friction material 36 and the generally planar backplate 34. Once all the friction material 36 wears, (and it is assumed that the friction material 36 wears evenly) then further use of the brake will cause metal to metal contact, i.e. the metal brake rotor will engage the metal generally planar backplate 34. The wear limit (WL) has been indicated on FIGS. 3, 5 and 8 in respect to the brake pads according to the present invention. Since the friction material 136 is again fixed to a flat region of the brake pad backplate 134, the wear limit is again at the interface between the friction material 136 and the brake pad backplate 134.

The brake pads should not be used right down to their wear limit since metal to metal contact will almost inevitably occur, thereby causing damage and/or creating a potential safety hazard. For this reason, brake manufacturers and brake pad manufacturers advise changing the brake pads before they have been worn to their absolute limit.

Depending upon the type of brake pad, then the wear limit WL need not necessarily be defined by the interface between the friction material 136 and the brake pad backplate 134. U.S. Pat. No. 6,279,222 discloses a brake pad having thickened circumferential ends with part of the friction material sitting within a recess between the circumferential ends. The wear limit occurs when the brake rotor contacts the locally thickened end.

In Great Britain Patent No. 1185176, the friction material is contained within a pressed recess of a backplate. The wear limit clearly occurs when the friction material has worn down to the level of the pressed edges of the backplate. Other brake pad designs have wear limits defined by differing features. Nevertheless, where the friction material is fixed to a metal backplate, the wear limit is defined as the point at which the rotor would contact some region of the backplate, i.e., the point at which metal to metal contact occurs.

Figure 8:
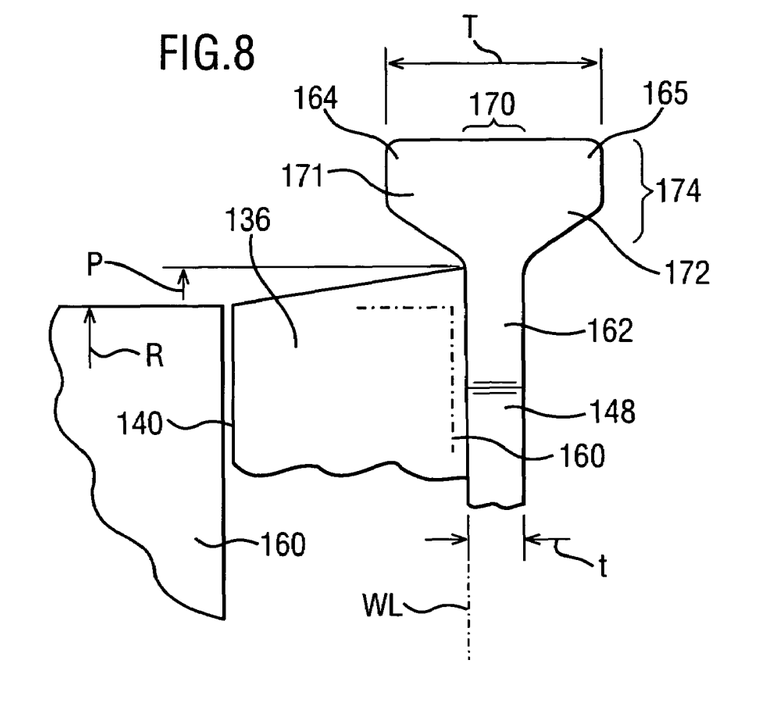
FIG. 8 is an enlarged view of the brake pad and rotor of FIG. 7 taken in the direction of arrow C.
Figure 9:
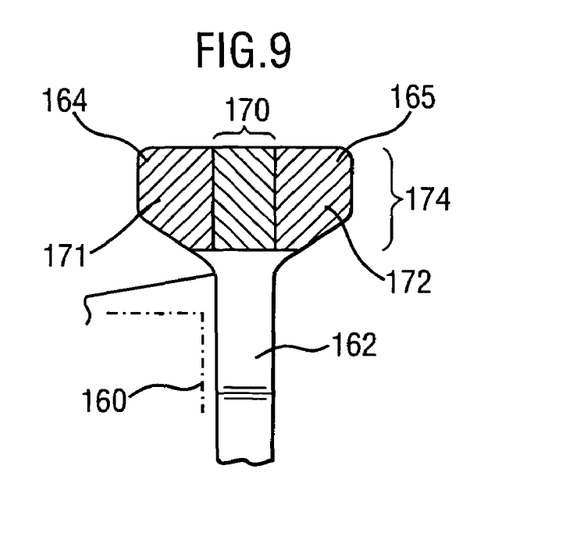
FIG. 9 is a part view of FIG. 8.
Figure 10:
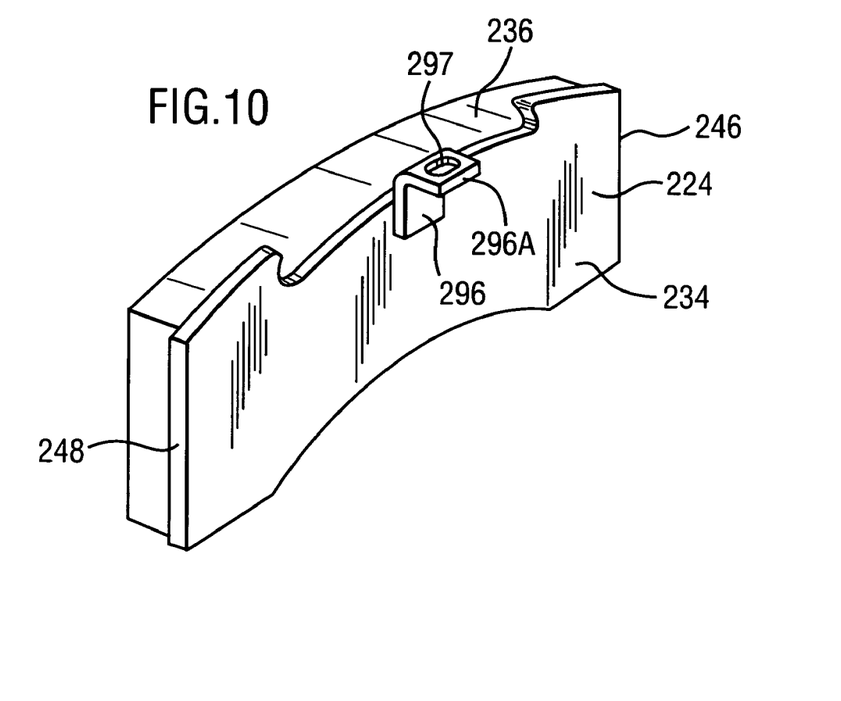
FIG. 10 shows a perspective view of a second embodiment of a caliper according to the present invention.
Figure 11:
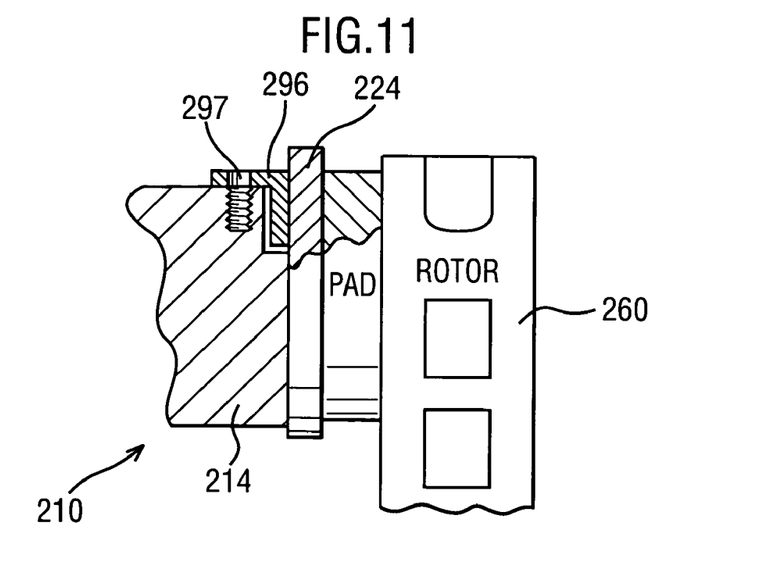
FIG. 11 shows a side view of the second embodiment of a caliper according to the present invention.

FIGS. 8 and 9 show (in chain dotted outline) the position of the brake rotor 160 when the brake pad is near its wear limit. The first lug surface 171 is positioned on the rotor side of the wear limit, i.e., to the left of the wear limit when viewing FIGS. 8 and 9. The first lug surface 171 forms a part of the first pad abutment 174 (the remaining part being an end surface region 170 and a first lug surface 172). For fixed caliper sliding rotor brakes, where a moving brake pad (inboard brake pad, actuator side brake pad) moves into a region previously occupied by the brake rotor, it is possible to provide at least a part of a pad abutment on the rotor side of a wear limit of the brake pad to increase the pad abutment area without increasing the overall size of the caliper. By increasing the pad abutment area in this manner, the brake pad is less likely to indent into the abutment region of the bridge arm. This is particularly applicable to heavy commercial land vehicles such as trucks, lorries and trailer units for trucks and lorries.

Furthermore, providing a generally uniform and generally smooth bridge abutment against which the pad abutment can engage whatever the state of wear of the friction material further minimizes indenting of the brake pad into the bridge abutment. Thus, considering the actuator side brake pad in an unworn condition, engagement between the first pad abutment 174 and the first bridge abutment 180A define a contact area of the first pad abutment, i.e., the contact area is the part of first pad abutment 174 that engages the first bridge abutment 180A. In the case of the moveable brake pad 122, the contact area is the combination of first lug surface 171, the end surface region 170, and the further first lug surface 172. As the friction material 136 wears, the moveable brake pad 122 advances towards the stationary brake pad 124, but nevertheless, substantially the entire contact area remains in contact with a part of the first bridge abutment 180A, albeit a progressively different part as the friction material 136 wears. This is not the case with Japanese Patent Application 7-1395790, in which progressively different parts of the actuator side pad abutment engage the projection.

The circumferential end 148 of the moveable brake pad 122 has a substantially constant thickness t apart from the first lug 164 and the further first lug 165. The circumferential end 148 has a constant thickness in an inner region at a radius smaller than the outer radius P of the friction material 136. The circumferential end 148 only becomes thicker T at a region outboard of the outer radius P of the friction material 36.

The moveable brake pad 122 is identical to the stationary brake pad 124, reducing the manufacturing costs. Furthermore, when assembling a pair of brake pads, it is irrelevant as to which side of the brake rotor a particular brake pad is assembled.

Because the brake pad backplate 134 is symmetrical about a centerline, it is irrelevant which side of the brake pad backplate 134 the friction material 136 is secured to when the brake pad is manufactured. This provides a less expensive brake pad, since the step of orientating the correct side of the brake pad backplate 134 when applying the friction material 136 is no longer required.

In one embodiment, the first bridge abutment 180A may extend over the brake rotor 160 to the reaction side portion 114. The first bridge abutment 180A can additionally be utilized to react the braking torque from the reaction side brake pad, simplifying the manufacture of the brake caliper 110 since only one set of machining operations is required to create the first bridge abutment 180A which then is utilized by both brake pads.

In a further embodiment, abutments can be provided in the reaction side portion 114 of the brake caliper 110 at a radius smaller than the outer radius R of the brake rotor 160. In this way, the brake torque can be reacted by the constant thickness inner region of the circumferential end 148, for example. It is possible to provide an identical pair of brake pads that utilize different regions of their circumferential ends to react brake torque, depending upon whether the particular brake pad is fitted as the moving brake pad 122 or as the stationary brake pad 174. Thus, the region of the fixed brake pad equivalent to the first pad abutment 174 of the moving brake pad is redundant for the purposes of reacting brake torque.

In a further embodiment, the brake torque applied to a stationary brake pad 124 can be reacted by a combination of the inner and outer regions of the stationary brake pad 124. The stationary brake pad 124 on a fixed caliper sliding rotor brake never moves into an area previously occupied by the brake rotor 160, such as the stationary brake pad 124 on FIGS. 3 and 4. Thus, it is not necessary to provide the pad abutments radially outboard of the outer radius R of the brake rotor 160, though in some circumstances (as mentioned above), it is nevertheless advantageous to do so.

FIGS. 10 to 14 show a second embodiment of a brake caliper 210 according to the present invention. The brake caliper 210 includes an actuator housing 212, a reaction side portion 214, bridge arms 215A and 215B, an inner brake pad 222 and an outer brake pad 224. The actuator housing 212, the reaction side portion 214, and the bridge arms 215A and 215B provide a frame 216. The brake caliper 210 is a fixed caliper. Thus, the brake rotor 260 is slideable on splines (not shown).

The actuator housing 212 is identical to the actuator housing 112, and the inner brake pad 222 is identical to the moveable brake pad 122. Abutment regions 280A and 280B are provided on the bridge arms 215A and 215B, respectively, in a manner similar to the first bridge abutment 180A and the second bridge abutment 180B of the brake caliper 110. The outer brake pad 224 is similar to the prior art outer brake pad 24 and includes a backplate 234, friction material 236 and circumferential ends 246 and 248.

Figure 12:
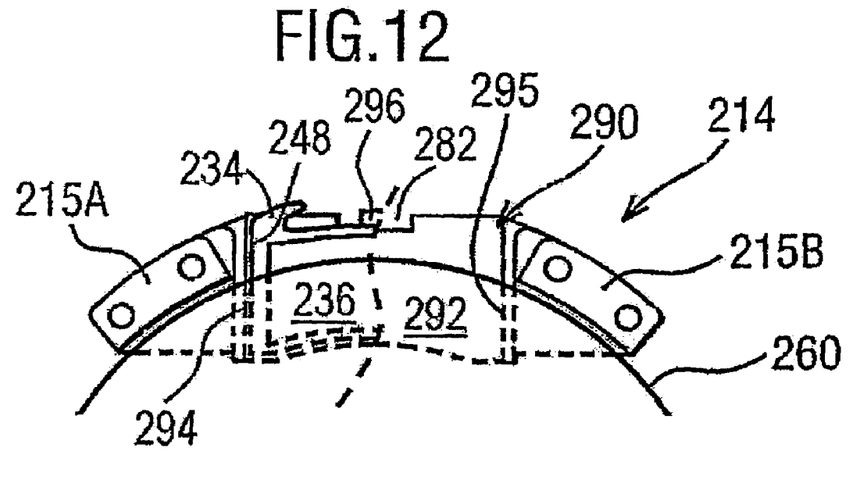
FIG. 12 shows a view of the second embodiment of a caliper according to the present invention.

The reaction side portion 214 includes a recess 290 for receiving the outer brake pad 224. The recess 290 has a flat face 292 against which the backplate 234 abuts. The recess 290 includes edges 294 mid 295, which act as abutment regions. In use, the circumferential end 246 lies near the edge 294, and the circumferential end 248 lies near the edge 295. The edges 294 and 295 are spaced apart slightly more than the circumferential ends 246 and 248 to allow insertion and removal of the outer brake pad 224. FIG. 12 shows the outer profile of the brake rotor 260. FIG. 12 also shows a semi-cutaway friction material 236 and a backplate 234. The majority of the edges 294 and 295 are at a radius smaller than the radius of the brake rotor 260. The majority of the circumferential ends 246 and 248 are at a radius smaller than the brake rotor radius. Thus, in use, the braking torque applied to the outer brake pad 224 during braking is reacted by the edge 294 or 295 (depending upon rotor rotational direction) at a radius smaller than the outer radius R of the brake rotor 160.

What is claimed is:

1. A brake caliper comprising:
   an actuator;
   a stationary brake pad;
   a moveable brake pad including a brake pad backplate having a generally planar portion, a first lug projecting from the generally planar portion towards the stationary brake pad, the first lug having a first lug surface and a tapered portion, wherein a first pad abutment is defined on the first lug surface to limit rotation of the moveable brake pad in a circumferential direction;
   a friction material secured to the brake pad backplate, wherein the friction material is generally arcuate in shape and defines a friction material outer radius, the friction material includes a friction face for engagement with a brake disc, the moveable brake pad defines a wear limit of the friction material at a wear limit plane that is substantially parallel to the friction face, and the first lug surface is located at a first radius that is larger than the friction material outer radius, and the first lug surface is positioned on a friction face side of the wear limit plane such that at least a portion of the first lug surface is spaced away from the wear limit plane and on the friction face side of the wear limit plane, wherein the first pad abutment includes the at least a portion of the first lug surface; and
   a frame including a housing region for receiving the actuator, a reaction side portion for receiving the stationary brake pad in an axially static manner, and a first bridge arm including a first bridge abutment connecting the housing region to the reaction side portion, wherein the actuator is operable to move the moveable brake pad towards the stationary brake pad, and the first pad abutment engages the first bridge abutment on the first bridge arm to limit rotation of the moveable brake pad in the circumferential direction.

2. The brake caliper as defined in claim 1 wherein the first bridge abutment is generally smooth.

3. The brake caliper as defined in claim 1 wherein substantially an entirety of the first pad abutment engages a portion of the first bridge abutment.

4. The brake caliper as defined in claim 1 wherein engagement between the first pad abutment and the first bridge abutment defines a contact area of the first pad abutment when the moveable brake pad is in an unworn condition, and substantially an entirety of the contact area engages the first bridge abutment as the friction material wears.

5. The brake caliper as defined in claim 1 wherein the generally planar portion includes a first circumferential end, and the first lug is positioned at the first circumferential end.

6. The brake caliper as defined in claim 5 wherein the generally planar portion further includes a first circumferential end surface region, and the first pad abutment is further defined on the first circumferential end surface region.

7. The brake caliper as defined in claim 1
   wherein the wear limit plane includes a backplate side that is opposite to the friction face side,
   wherein the brake pad backplate includes a further first lug that projects from the backplate side of the wear limit plane, the further first lug includes a further first lug surface, and the first pad abutment is further defined on the further first lug surface of the further first lug, and
   wherein the further first lug is substantially opposite to the first lug.

8. The brake caliper as defined in claim 7 wherein the first lug surface, the further first lug surface and a first circumferential end surface region are substantially contiguous.

9. The brake caliper as defined in claim 1 wherein the generally planar portion has a planar thickness and the first pad abutment has an abutment thickness, and the abutment thickness of the first pad abutment is at least twice as thick as the planar thickness of the generally planar portion.

10. The brake caliper as defined in claim 9, wherein the abutment thickness of the first pad abutment is at least three times as thick as the planar thickness of the generally planar portion.

11. The brake caliper as defined in claim 1 wherein a first area of a first cross section of the first lug taken substantially parallel to the wear limit plane at a part of the first lug that is remote from the generally planar portion is smaller than a second area of a second cross section of the first lug taken substantially parallel to the wear limit plane at another part of the first lug that is near the generally planar portion.

12. The brake caliper as defined in claim 11 wherein the first lug generally tapers from the part of the first lug that is remote from the generally planar portion to the another part of the first lug that is near the generally planar portion to define the tapered portion.

13. The brake caliper as defined in claim 1 wherein the brake pad backplate includes a substantially flat region that defines the wear limit, and the friction material is fixed to the substantially flat region of the brake pad backplate.

14. The brake caliper as defined in claim 1
   wherein the brake pad backplate includes a second pad abutment to limit rotation of the moveable brake pad in a second direction different from the circumferential direction,
   wherein the brake pad backplate includes a second lug projecting from the generally planar portion having a second lug surface, the second pad abutment is defined on the second lug surface, and the second lug surface is located at a second radius that is larger than the friction material outer radius and is positioned on the friction face side of the wear limit plane,
   wherein the frame further includes a second bridge arm including a second bridge abutment, and the second bridge arm connects the housing region to a stationary brake pad recess region,
   wherein the second pad abutment engages the second bridge abutment on the second bridge arm to limit rotation of the moveable brake pad in the second direction, and
   wherein the second pad abutment and the second bridge abutment are generally radially orientated.

15. The brake caliper as defined in claim 1 wherein the moveable brake pad and the stationary brake pad are identical.

16. The brake caliper as defined in claim 14 wherein the stationary brake pad includes a first stationary pad abutment that engages the second bridge abutment on the second bridge arm to limit rotation of the stationary brake pad in the second direction.

17. The brake caliper as defined in claim 1 wherein the stationary brake pad includes a circumferential end that abuts the frame at an end radius that is smaller than the friction material outer radius to limit rotation of the stationary brake pad in a second direction different from the circumferential direction.

18. The brake caliper as defined in claim 1 wherein the stationary brake pad and the moveable brake pad are different, and the stationary brake pad abuts the frame at an end radius that is smaller than the friction material outer radius to limit rotation of the stationary brake pad in a second direction different from the circumferential direction.

19. The brake caliper as defined in claim 2 wherein substantially an entirety of the first pad abutment engages a portion of the first bridge abutment.

20. The brake caliper as defined in claim 19 wherein engagement between the first pad abutment and the first bridge abutment defines a contact area of the first pad abutment when the moveable brake pad is in an unworn condition, and substantially an entirety of the contact area engages the first bridge abutment as the friction material wears.

21. The brake caliper as defined in claim 2 wherein engagement between the first pad abutment and the first bridge abutment defines a contact area of the first pad abutment when the moveable brake pad is in an unworn condition, and substantially an entirety of the contact area engages the first bridge abutment as the friction material wears.

22. The brake caliper as defined in claim 3 wherein engagement between the first pad abutment and the first bridge abutment defines a contact area of the first pad abutment when the moveable brake pad is in an unworn condition, and substantially an entirety of the contact area engages the first bridge abutment as the friction material wears.

23. The brake caliper as defined in claim 7 wherein the first lug and the further first lug are substantially symmetrical about a plane substantially parallel to the wear limit plane.

24. The brake caliper as defined in claim 7 wherein the first lug and the further first lug are substantially at a common radial distance from a base of the moveable brake pad.

25. The brake caliper as defined in claim 7 wherein the first lug and the further first lug are substantially at a common circumferential position.

26. The brake caliper as defined in claim 11 wherein a first height of the first lug in a radial direction at the first area of the first cross section is smaller than a second height of the first lug in the radial direction at the second area of the second cross section.

27. The brake caliper as defined in claim 7 wherein a first area of a first cross section of the first lug taken substantially parallel to the wear limit plane at a part of the first lug that is remote from the generally planar portion is smaller than a second area of a second cross section of the first lug taken substantially parallel to the wear limit plane at another part of the first lug that is near the generally planar portion.

28. The brake caliper as defined in claim 1 wherein the friction material outer radius has a center of curvature, and the first pad abutment and the first bridge abutment are generally radially orientated relative to the center of curvature.

29. The brake caliper as defined in claim 1 wherein the tapered portion of the first lug tapers circumferentially.

30. The brake caliper as defined in claim 1 wherein the tapered portion of the first lug tapers radially.

31. The brake caliper as defined in claim 1 wherein a first area of a first cross section of the first lug taken substantially perpendicular to a radial direction of the friction material at the first radius is greater than a second area of a second cross section of the first lug taken substantially perpendicular to the radial direction of the friction material.

32. The brake caliper as defined in claim 31 wherein the first cross section is at a larger radius than the second cross section.

33. The brake caliper as defined in claim 1 wherein the first pad abutment is flat.

34. The brake caliper as defined in claim 29 wherein the first pad abutment is flat.

35. The brake caliper as defined in claim 30 wherein the first pad abutment is flat.

36. The brake caliper as defined in claim 31 wherein the first pad abutment is flat.

37. The brake caliper as defined in claim 1 wherein a first area of a first cross section of the first lug taken substantially parallel to the first pad abutment at a part of the first lug that is proximate the first pad abutment is greater than a second area of a second cross section of the first lug taken substantially parallel to the first pad abutment at another part of the first lug that is remote from the first pad abutment.

38. The brake caliper as defined in claim 1 wherein an area of the first pad abutment is greater than any other area of a cross section of the first lug taken substantially parallel to the first pad abutment.

39. The brake caliper as defined in claim 29 wherein an area of the first pad abutment is greater than any other area of a cross section of the first lug taken substantially parallel to the first pad abutment.

40. The brake caliper as defined in claim 30 wherein an area of the first pad abutment is greater Than any other area of a cross section of The first lug taken substantially parallel to the first pad abutment.

41. The brake caliper as defined in claim 31 wherein an area of the first pad abutment is greater than any other area of a cross section of the first lug taken substantially parallel to the first pad abutment.

42. The brake caliper as defined in claim 1 wherein the brake pad backplate is cast.

43. The brake caliper as defined in claim 29 wherein the brake pad backplate is cast.

44. The brake caliper as defined in claim 30 wherein the brake pad backplate is cast.

45. The brake caliper as defined in claim 31 wherein the brake pad backplate is cast.

46. The brake caliper as defined in claim 7 wherein the brake pad backplate is cast.

47. The brake caliper as defined in claim 1 wherein the first pad abutment and the first bridge abutment are generally radially orientated.

* * * * *

UNITED STATES PATENT AND TRADEMARK OFFICE
CERTIFICATE OF CORRECTION

Figure 13:
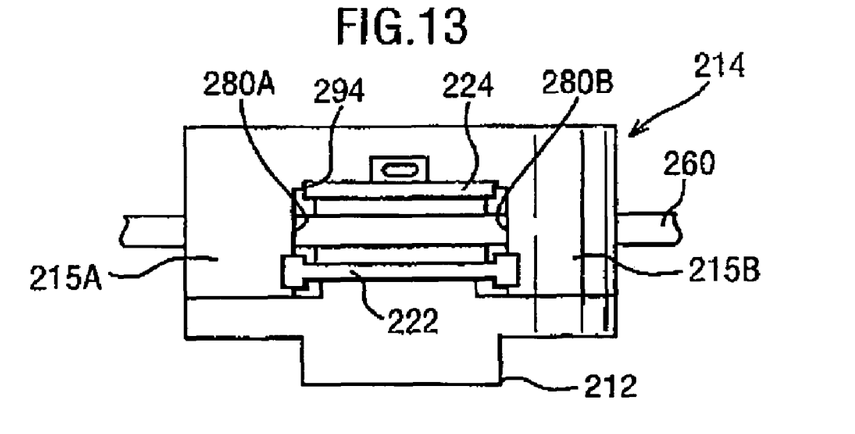
FIG. 13 shows another view of the second embodiment of a caliper according to the present invention.
Figure 14:
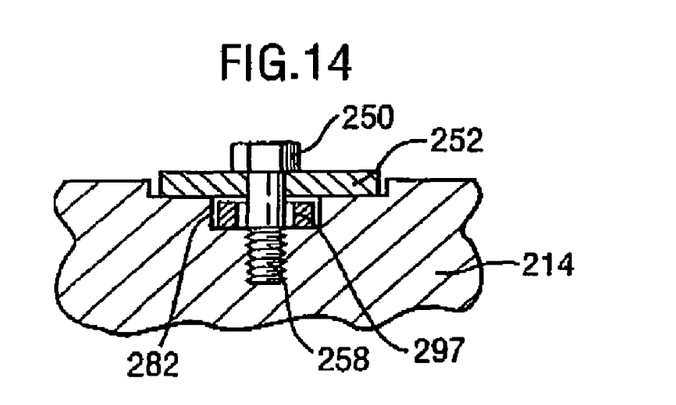
FIG. 14 shows another view of the second embodiment of a caliper according to the present invention.

PATENT NO. : 7,316,301 B2 Page 1 of 2
APPLICATION NO. : 10/954161
DATED : January 8, 2008
INVENTOR(S) : Roberts It is certified that error appears in the above-identified patent and that said Letters Patent is hereby corrected as shown below:

Drawing sheet number 10, consisting of Figures 13 and 14, should be replaced with the attached page.

Signed and Sealed this

Third Day of March, 2009

JOHN DOLL
*Acting Director of the United States Patent and Trademark Office*

FIG. 13

FIG. 14